United States Patent [19]

Nudenberg et al.

[11] 4,347,159

[45] Aug. 31, 1982

[54] ACTIVATORS FOR ZIEGLER TYPE POLYMERIZATION CATALYSTS

[75] Inventors: Walter Nudenberg, Newtown; Yong S. Rim, Woodbridge; Demetreos N. Matthews, Bethany, all of Conn.

[73] Assignee: Uniroyal, Inc., New York, N.Y.

[21] Appl. No.: 152,900

[22] Filed: May 23, 1980

[51] Int. Cl.³ .............................................. C08F 4/68
[52] U.S. Cl. ......................... 252/429 B; 252/431 R; 252/431 C; 526/140; 526/143
[58] Field of Search ............ 252/429 B, 431 R, 431 C

[56] References Cited

U.S. PATENT DOCUMENTS

| | | | |
|---|---|---|---|
| 3,026,311 | 3/1962 | Coover et al. | 252/429 B X |
| 3,845,159 | 10/1974 | Takeshita | 252/429 B X |
| 4,168,358 | 9/1979 | Harada et al. | 252/429 B X |
| 4,243,782 | 1/1981 | Bye et al. | 252/429 B X |

*Primary Examiner*—Patrick Garvin
*Attorney, Agent, or Firm*—Andrew D. Maslow

[57] ABSTRACT

A catalyst composition is provided with an activator in combination with a primary catalyst system. The primary catalyst system is a vanadium compound and an organometallic compound of the formula RMgX, LiAlr₄, or $R_A Al_2 X_B$, wherein R is a hydrocarbon radical having 1 to 12 carbon atoms, X is a halogen atom; A is a number from 2 to 6, and B is a number from 0 to 4, with the proviso that the sum of A and B is 6 and that at least one of the groups attached either to the vanadium compound or to the organometallic compound is a halogen atom. The activator is a chlorinated tetrahydrofurfuryl tetrahydrofuroate, an alkyl ester of chlorinated tetrahydrofuroic acid wherein the alkyl group has 1 to 8 carbon atoms, a chlorinated alkylene bistetrahydrofuroate wherein the alkylene group has 2 or 3 carbon atoms, a chlorinated oxy-bis [alkylene (2-furoate)], wherein the alkylene group is ethanediyl, 1,3 propanediyl, alkyl substituted ethanediyl or alkyl substituted 1,3 propanediyl wherein the alkyl group on the ethanediyl or 1,3 propanediyl has 1 to 8 carbon atoms, or bis (trichloromethyl)sulfone.

19 Claims, No Drawings

ACTIVATORS FOR ZIEGLER TYPE POLYMERIZATION CATALYSTS

BACKGROUND OF THE INVENTION

The present invention relates to new catalyst compositions and to methods for the polymerization of alpha-olefins using these improved catalysts.

Ionic coordination polymerization catalysts which are the interaction products of: (1) a compound of a metal of Group IV-B or V-B of the periodic table of elements; and, (2) an organometallic compound of a metal of Group III-A of the periodic table are well known. Such catalysts are disadvantageous in that low catalyst activity (weight of polymer per weight of transition metal compound per unit time) is obtained in many cases; in that the polymerization rate is undesirably slow unless relatively high concentrations of catalyst are used; and in that when a soluble catalyst system is used, the activity often decreases rapidly during the course of polymerization.

The present invention is based on the surprising discovery that a catalyst based on a vanadium compound and an organometallic compound (hereinafter also referred to as the primary catalyst system) is made more effective and/or maintains its activity for a longer period and/or can be reactivated after it begins to lose activity, if an activator is added to said catalyst. In some cases the addition of the activator also serves to regulate the molecular weight. A catalyst activator is a material or compound which reacts with a spent catalyst, returning the catalyst to a condition in which it can continue to promote the intended chemical reaction. Earlier combinations of similar catalysts and their activators are described in U.S. Pat. Nos. 3,377,325 using sulfur activation, U.S. Pat. No. 3,377,326 using phosphorous trichloride and 2-nitropropane activation, U.S. Pat. No. 3,441,546 using organic nitro compound activation, U.S. Pat. No. 3,444,149 using nitroso compound or quinone activation, U.S. Pat. No. 3,462,399 with activation by organic nitrates, organic nitrites, azoxy compounds, special organo metallic compounds or alkyl disulfide and U.S. Pat. No. 3,507,843 using phosphorous trichloride activation.

SUMMARY OF THE INVENTION AND DESCRIPTION OF THE PREFERRED EMBODIMENTS

The catalyst composition of the present invention comprises an activator in combination with a primary catalyst system, wherein said primary catalyst system comprises a vanadium compound and an organometallic compound of the formula $RMgX$, $LiAlR_4$, or $R_AAl_2X_B$, where R is a hydrocarbon radical having from 1 to 12 carbon atoms, preferably an alkyl radical having 1 to 12 carbon atoms, X is a halogen atom, A is a number from 2 to 6, and B is a number from 0 to 4, with the proviso that the sum of A and B is 6 and that at least one of the groups attached either to the vanadium compound or to the organometallic compound is a halogen atom (e.g. fluorine, chlorine, bromine and iodine), wherein said activator is a chlorinated tetrahydrofurfuryl tetrahydrofuroate, preferably tetrachlorotetrahydrofurfuryl tetrachlorotetrahydrofuroate, an alkyl ester of chlorinated tetrahydrofuroic acid, preferably of tetrachlorotetrahydrofuroic acid, wherein the alkyl group has 1 to 8 carbon atoms, preferably 4 to 6 carbon atoms, a chlorinated alkylene bis-tetrahydrofuroate wherein the alkylene group has 2 or 3 carbon atoms, a chlorinated oxy-bis [alkylene (2-furoate)], wherein the alkylene group is ethanediyl, 1,3 propanediyl, alkyl substituted ethanediyl, alkyl substituted 1,3 propanediyl, wherein the alkyl group on the ethanediyl or 1,3 propanediyl has 1 to 8 carbon atoms, preferably 1 to 6 carbon atoms, or bis (trichloromethyl)sulfone.

The present invention also comprises a method for the preparation of a catalyst comprising reacting a chlorinated tetrahydrofurfuryl tetrahydrofuroate, preferably tetrachlorotetrahydrofurfuryl tetrachlorotetrahydrofuroate, an alkyl ester of chlorinated tetrahydrofuroic acid, preferably tetrachlorotetrahydrofuroic acid wherein the alkyl group has 1 to 8 carbon atoms, preferably 1 to 6 carbon atoms, a chlorinated alkylene bis-tetrahydrofuroate, wherein the alkylene group has 2 or 3 carbon atoms, a chlorinated oxy-bis [alkylene (2-furoate)] wherein the alkylene group is ethanediyl, 1,3 propanediyl, alkyl substituted ethanediyl, alkyl substituted 1,3 propanediyl, wherein the alkyl group on the ethanediyl or 1,3 propanediyl has 1 to 8 carbon atoms, preferably 1 to 6 carbon atoms; or bis (trichloromethyl) sulfone with the reaction product of a vanadium compound and an organometallic compound of the formula: $RMgX$, $LiAlR_4$ or $R_AAl_2X_B$ wherein R, X, and B are as defined above, in the presence of monomer or monomers.

The present invention also relates to a method of polymerizing alpha-olefins using the catalyst of the present invention and to polymers prepared by said method of polymerizing alpha-olefins. The alpha-olefin molecules polymerized may all be the same or they may be different. For example, polymerization of ethylene to yield polyethylene, or polymerization of a mixture of ethylene and propylene to yield a copolymer. A preferred method of polymerization is the use of ethylene, propylene and a polyene to prepare a sulfur vulcanizable terpolymer.

The primary catalyst system can be prepared separately and then added to the polymerization system or it may be prepared in situ. The activator may be added to the polymerization system before, during or after the introduction of the primary catalyst system. The activator may even be added to a component of the primary catalyst system before a second component of the system is added.

Non-limiting examples of vanadium compounds which may be used in the catalyst composition of the present invention are vanadium halides, oxyhalides, alkoxides, preferably alkoxides having 1 or 2 carbon atoms, and acetylacetonates. Examples of halides are fluorides, chlorides, bromides and iodides. Specific examples of vanadium compounds are vanadium trichloride, vanadium tetrachloride, vanadium tetrabromide, vanadium oxytrichloride, alkyl vanadates, preferably alkyl vanadates having 1 to 12 carbon atoms, vanadyl acetylacetonates, vanadium acetylacetonates, and halovanadates.

The empirical formula $R_AAl_2X_B$ used to describe certain organoaluminum compounds of the primary catalyst system is intended to include a wide variety of compounds or mixtures of compounds that might result from mixing together trialkylaluminum and aluminum trihalides in various ratios. Specific examples of such organoaluminum compounds are ethylaluminum sesquichloride, or dimeric analogues of diisobutylaluminum chloride, ethylaluminum dibromide, tri-n-hexylaluminum, diethylaluminum iodide, tridecylaluminum or methylaluminum sesquichloride.

Non-limiting examples of the compound having the formula $LiAlR_4$ used in the primary catalyst system are lithium tetraalkylaluminates such as the tetraethylaluminate, the tetrabutylaluminate, and the tetrahexylaluminate.

Chlorination of the aforementioned tetrahydrofurfuryl tetrahydrofuroate, alkyl ester of tetrahydrofuroic acid, alkylene bistetrahydrofuroate, and oxy-bis [alkylene(2-furoate)] compounds can result in 3,4,5 or 6 chlorine atoms replacing respective hydrogen atoms on each tetrahydrofuryl group or on each attached chain. Each such compound will provide some degree of catalyst activation. The preferred compounds are those where the furan rings of the furoates and/or the furfuryl ester are tetrachlorinated. Alpha-olefin copolymer and terpolymer polymerization processes many times produce a build-up of acid in the reactor, and this in turn results in an uncontrolled, preferential polymerization of one monomer versus another. The reaction can be stabilized by introducing a suitable acid scavenger. The ether oxygen linkage in the oxy-bis furoates provides good acid acceptance for this purpose.

Non-limiting examples of RMgX used in the primary catalyst system are decylmagnesium iodide, decylmagnesium chloride, dodecylmagnesium bromide, dodecylmagnesium chloride, phenylmagnesium chloride and hexylmagnesium bromide.

Non-limiting examples of an alkyl ester of tetrachlorotetrahydrofuroic acid are the methyl, ethyl, butyl, hexyl, octyl, isopropyl, sec-butyl, and tert-butyl esters. Non-limiting examples of chlorinated alkylene-bis-2-furoates are ethylene-bis-(2-furoate), and propylene-bis-(2-furoate). Non-limiting examples of oxy-bis-[alkylene(2-furoates] are oxy-bis[ethylene(2-furoate)], and oxy-bis [propylene(2-furoate)]. The preferred esters are those most readily soluble in hydrocarbon solvents, those having the greatest furoate content, and those which will not give volatile fragments which create odors in the resulting polymers. Preferred furoates are butyl tetrachlorotetrahydrofuroate, tetrachlorotetrahydrofurfuryl tetrachlorotetrahydrofuroate, and the chlorinated oxy-bis-alkylenefuroates.

Non-limiting examples of alpha-olefins that can be polymerized with the catalyst of the present invention are ethylene, propylene, butene, etc. and mixtures thereof. In order to introduce unsaturation for vulcanization of the polymer, a polyene can be employed in small amounts. The polyene or other ethylenically unsaturated compounds containing a plurality of carbon to carbon double bonds may be selected from those disclosed in the prior art for use as third monomers in the preparation of ethylene-propylene-polyene terpolymers including open chain polyunsaturated hydrocarbons containing 4 to 20 carbon atoms, such as 1,4-hexadiene, 11-ethyl-1,11-tridecadiene, 1,9 octadecadiene, monocyclic polyenes and polycyclic polyenes. The polyunsaturated bridged-ring hydrocarbons may be used such as polyunsaturated derivatives of bicyclo(2,2,1) heptane wherein at least one double bond is present in one of the bridged rings, such as dicyclopentadiene, bicyclo(2,2,1) hepta-2,5-diene, the alkylidene norbornenes, and especially the 5-alkylidene-2-norbornenes wherein the alkylidene group contains 1 to 20 carbon atoms and preferably 1 to 8 carbon atoms, the alkenyl norbornenes and especially the 5-alkenyl-2-norbornenes wherein the alkenyl group contains about 3 to 20 carbon atoms and preferably 3 to 10 carbon atoms. Other bridged-ring hydrocarbons include polyunsaturated derivatives of bicyclo (2,2,2) octane such as bicyclo (2,2,2) octa-2,5-diene, polyunsaturated derivatives of bicyclo (3,2,1) octane, polyunsaturated derivatives of bicyclo (3,3,1) nonane and polyunsaturated derivatives of bicyclo (3,2,2) nonane. At least one double bond is present in a bridged ring of the above compounds and at least one other double bond is present in a bridged ring or in a side chain.

The preferred primary catalyst system for terpolymerization or copolymerization of ethylene and propylene is a hydrocarbon soluble catalyst formed by the interaction of vanadium oxychloride, vanadium tetrachloride, an alkyl vanadate, more preferably an alkyl vanadate wherein the alkyl group has 1 to 12 carbon atoms, or an alkylchlorovanadate, more preferably, an alkylchlorovanadate wherein the alkyl group has 1 to 12 carbon atoms, and an alkylaluminum halide, more preferably, an alkylaluminum halide having 1 to 12 carbon atoms. In these preferred soluble catalyst systems, the gram atom ratio of aluminum to vanadium is at least 5:1 and preferably 10:1. Higher ratios such as 20:1, 35:1, and 50:1 or higher, may also be used, especially if the amount of vanadium used is small. In the last case, 200:1 ratios could be envisioned. These preferred soluble catalyst systems have the ability to form amorphous, rubbery sulfur-vulcanizable high quality rubber stocks. Although the soluble catalyst compositions are preferred for rubbery compositions such as ethylene propylene copolymers, it is understood that in other cases, notably the homopolymerization of propylene, the insoluble or heterogeneous type of catalyst is preferred.

The amount of activator used in the present invention is not especially critical. Small amounts on the order of 0.01 moles of activator per mole of vanadium are sufficient to produce a noticeable activity in some cases. Usually, it is preferred to use somewhat larger amounts, typically from about 1 to about 10 moles of activator per mole of vanadium. Even larger amounts can be used, if desired. Fifty moles or more can be employed, especially if the gram atom ratio of aluminum to vanadium is 50 or more. In any case, it may be harmful to add more activator than the amount of the organoaluminum compound.

The polymerization process is carried out in an inert solvent. However, an added solvent is generally not essential as excess monomer or monomers being polymerized may serve as the solvent. In general, the normal solvents used in ionic coordination type polymerization may be used. These include the aromatic hydrocarbons, aliphatic hydrocarbons, chlorobenzene, tetrachloroethylene, and other solvents which do not destroy the catalyst. The polymerization can be carried out as in the conventional practice. For example, a temperature of polymerization of $-20°$ to $200°$ C., a pressure of 1 to 50 atm or higher, a vanadium to co-catalyst/molar ratio of 0.001 to 2, monomer molar ratios of 1/1 to 1/200 of ethylene to propylene in solution are typical, but not limiting, conditions.

The following examples will serve to illustrate the practice of the invention in more detail. The efficiency of the catalyst is calculated in all examples as grams of polymer per gram of vanadium compound.

EXAMPLE 1

Preparation of Furfuryl Furoate

This ester was prepared according to the method of E.R. Nielsen disclosed in J. Am. Chem. Soc. 66 1230 (1944).

The ester was purified by low temperature recrystallization from a mixed solvent comprising 20 ml of ether and 10 ml of petroleum ether for each 10 g of ester. The resulting solid, having a melting point of 29°–31.5° C., was obtained in 90% recovery.

EXAMPLE 2

Preparation of Tetrachlorotetrahydrofurfuryl Tetrachlorotetrahydrofuroate (ZXU)

A solution of 0.25 moles (48 g) of furfuryl furoate in 750 ml of $CCl_4$ was cooled to $-15°$ C. under an atmosphere of nitrogen. To this solution was added 500 ml of a 2 M chlorine solution in $CCl_4$ which had been cooled to $-10°$ C. The addition was carried out under rapid stirring and a nitrogen atmosphere at a rate that would ensure that the temperature did not go above 0° C. After the addition of chlorine solution, the reaction mixture was stirred for 1 to 2 hours at $-10°$ C. under nitrogen. The unreacted chlorine was removed by passing a slow stream of nitrogen through the solution and allowing the solution to warm to room temperature slowly. The $CCl_4$ was then stripped-off on a rotary evaporator and the last traces of $CCl_4$ were removed by exposing the reaction mixture to a high vacuum overnight. The thick syrup obtained at this point was completely colorless and when protected from light and moisture it remained colorless for long periods of time.

The N.M.R. was consistent with the following structure:

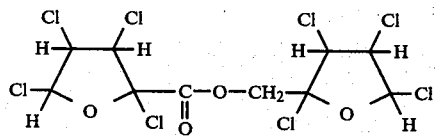

The N.M.R. spectrum had a downfield intensity ratio of 6/2, as expected. The various isomers possible were expected to give a complicated spectrum and such a spectrum was obtained. Elemental analysis was also consistent with the proposed structure. The refractive index at 20° C. was 1.5334.

| Elemental Analysis For: $C_{10}H_8Cl_8O_4$ | |
|---|---|
| Calculated | Found |
| % C 25.24 | 23.82 |
| % H 1.69 | 1.70 |
| % Cl 59.61 | 59.72 |

The toxicology of ZXU was as follows:
Acute Oral-$LD_{50}$=1.1±0.15 g/Kg of body weight (rats)
Primary Skin Irritation=Moderate irritant on rabbit skin
Eye irritation=Mild irritant if material washed out 4 seconds after introduction; severe irritant if left in without washout.
The Ames Test was negative for mutagenicity. With reasonable care, it can be used in a production process.

EXAMPLE 3

Preparation of Butyl 2,3,4,5-Tetrachloro-2,3,4,5,Tetrahydro-2-Furoate (UKU)

In a 500 ml three necked round bottom flask, 33.6 g (0.2 moles) of freshly distilled 2-butylfuroate was dissolved in 200 ml of dry $CCl_4$ and cooled to 0° C. by an outside ice-salt bath. Then, 0.4 moles of $Cl_2$ gas was bubbled slowly into the solution over a period of four hours. In order to eliminate any unreacted gas from the reaction mixture, dry nitrogen was passed through the mixture while warming to room temperature until the solution became colorless. The $CCl_4$ solvent was removed by rotary evaporation under house vacuum at about 40° C. The resulting viscous liquid was used as the catalyst reactivator without further purification. The yield was almost quantitative.

| Elemental Analysis For: $C_9H_{12}Cl_4O_3$ | |
|---|---|
| Calculated | Found (Performed in duplicate) |
| % C 34.86 | 34.82, 34.79 |
| % H 3.90 | 3.69, 3.37 |
| % Cl 45.75 | 43.68, 43.57 |

N.M.R.: Chemical shift and splitting pattern agreed with the following proposed structure:

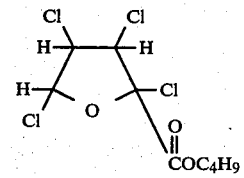

Methyl group (from butyl radical) at 97 Hz (as triplet);
—$(CH_2)_2$— centered at 160 Hz (as multiplet);
—O—$CH_2$— at 427 Hz (as triplet)
Two ring hydrogens alpha to chlorine at 487 Hz (as multiplet), and, the ring hydrogen next to oxygen at 630 Hz (as multiplet).

The Ames Test was negative for mutagenicity.

EXAMPLE 4

Preparation of Methyl 2,3,4,5-Tetrachloro-2,3,4,5-Tetrahydro-2-Furoate

This compound was prepared by the method of Example 3 except that methyl furoate was used in place of butyl furoate.

| Elemental Analysis For: $C_6H_6Cl_4O_3$ | |
|---|---|
| Calculated | Found |
| % C 26.90 | 26.72, 26.22 |
| % H 2.26 | 1.93, 1.91 |
| % Cl 52.93 | 57.89, 57.90 |

EXAMPLE 5

Preparation of Ethyl 2,3,4,5-Tetrachloro-2,3,4,5-Tetrahydro-2-Furoate (TOU)

This compound was prepared by the method of Example 3, using ethyl furoate in place of butyl furoate.

| Elemental Analysis For: $C_7H_8Cl_4O_3$ | | |
|---|---|---|
| | Calculated | Found |
| % C | 29.82 | 29.43, 29.23 |
| % H | 2.84 | 2.35, 2.27 |
| % Cl | 50.31 | 49.78, 49.78 |

EXAMPLE 6

Chlorination of Hexyl 2-Furoate

This compound was prepared by the method of Example 3, using hexylfuroate in place of butyl furoate.

| Elemental Analysis For: $C_{11}H_{15}Cl_5O_3$ | | |
|---|---|---|
| | Calculated | Found |
| % C | 35.47 | 33.67, 33.52 |
| % H | 4.06 | 3.47, 3.55 |
| % Cl | 47.59 | 45.81, 45.80 |

EXAMPLE 7

Activation Experiments in the Chemco Reactor Using UKU (See Example 3)

Two liters of chromatographed (alumina), dry hexane were added to a one gallon clean dry Chemco Reactor (trademark of Chemical Equipment Corporation; Tulsa, OK., 74135). To this was added the requisite amount of 25% (0.740 M) ethyl aluminum sesquichloride (EASC) solution. Propylene was added to an equilibrium pressure of 34 psig, hydrogen to 36 psig, and ethylene to a total of 50 psig. A 5 ml sample of ethylidene norbornene (ENB) was added and the polymerization was initiated by the addition of the VOCl₃ solution.

After five minutes the requisite amount of a 1 M UKU solution was added to provide the activation. After one hour, the polymerization was short-stopped with polypropylene glycol and the polymer recovered by flocculation with isopropanol containing antioxidant. The polymer was then chopped in a Waring blender (trademark of Waring Products, East Hartford, Ct.) containing fresh isopropanol (plus antioxidant) and was then dried.

The results shown in Table I indicate that good activation is obtained with an increase in efficiency from 635 to 1177 in the lowest case and an increase to 2331 in the highest case. There was a very pronounced tendency to lower molecular weights as the concentration of UKU was increased. Compare, for example, the viscosity of the product of Run A (the blank) with the viscosities of the products of runs B and C.

TABLE 1

| | Polymerization Data Using UKU as an Activator | | | | | | | | | |
|---|---|---|---|---|---|---|---|---|---|---|
| | Run | | | | | | | | | |
| | A | B | C | D | E | F | G | H | I | J |
| Hexane (liters) | 2 | 2 | 2 | 2 | 2 | 2 | 2 | 2 | 2 | 2 |
| EASC$^{(a)}$ (millimoles) | 15 | 15 | 15 | 18 | 22 | 15 | 15 | 15 | 15 | 15 |
| VOCl₃ (millimoles) | 1 | 1 | 1 | 1 | 1 | 0.5 | 0.5 | 0.5 | 0.5 | 0.2 |
| Aluminum/Vanadium$^{(e)}$ | 30 | 30 | 30 | 36 | 44 | 60 | 60 | 60 | 60 | 150 |
| | 1 | 1 | 1 | 1 | 1 | 1 | 1 | 1 | 1 | 1 |
| UKU (millimoles) | — | 1 | 2 | 3 | 6 | 0.5 | 1 | 1.5 | 3 | 1 |
| Hydrogen (PSI) | 2 | 2 | 2 | 2 | 2 | 2 | 2 | 2 | 2 | 2 |
| Yield (grams) | 110 | 204 | 232 | 253 | 314 | 154 | 187 | 182 | 202 | 160 |
| Flocculation Solvent | (b) | (b) | (b) | (b) | (b) | (b) | steam | (b) | steam | (b) |
| IV$^{135}$ (tetralin)$^{(c)}$ | 2.07 | 1.5 | 1.26 | 1.46 | 0.98 | 2.0 | 1.6 | 1.57 | 1.55 | 1.98 |
| ML₄$^{212(d)}$ | — | 51 | 34 | 29 | 14 | — | 57 | 53 | 56 | 73 |
| % Propylene | — | 52 | 54 | 54 | 57 | 47 | 50 | 52 | 53 | 50 |
| Efficiency (g Polymer/g VOCl₃) | 635 | 1177 | 1339 | 1460 | 1812 | 1777 | 2158 | 2100 | 2331 | 1846 |

$^{(a)}$Ethylaluminumsesquichloride.
$^{(b)}$Isopropanol
$^{(c)}$Intrinsic Viscosity in Tetralin at 135° C.
$^{(d)}$Mooney Viscosity at 212° F. after 4 minutes.
$^{(e)}$Gram atoms aluminum/gram atom vanadium.

EXAMPLE 8

Activation Studies Using ZXU as an Activator

The conditions used in the studies of UKU were followed except that the activator was added after the Et₃Al₂Cl₃ and before the polymerization was initiated. From the results showed in Table II, activation but not very much regulation is observed. So, if one desires to have high molecular weight and still obtain good activation, ZXU may be preferred over UKU.

TABLE II

| | ZXU as Activator in EPM Polymerization | | | | | | |
|---|---|---|---|---|---|---|---|
| | A | B | C | D | E | F | G |
| Hexane (liters) | 2 | 2 | 2 | 2 | 2 | 2 | 2 |
| EASC$^{(a)}$ (millimoles) | 16.5 | 16.5 | 16.5 | 16.5 | 16.5 | 22.4 | 16.5 |
| VOCl₃ (millimoles) | 1 | 1 | 1 | 1 | 1 | 1 | 0.5 |
| Aluminum Vanadium | 33/1 | 33/1 | 33/1 | 33/1 | 33/1 | 45/1 | 66/1 |
| ZXU (milliequivalents) | — | — | 1 | 2 | 3 | 3 | 1 |
| Yield (grams) | 125 | 117 | 173 | 197 | 195 | 218.5 | 130 |
| IV$^{135}$ in Tetralin$^{(b)}$ | 2.34 | 2.26 | 1.80 | 1.58 | 1.56 | 1.50 | 2.30 |
| ML₄$^{212(c)}$ | 125 | 117 | 75 | 58 | 55 | 50 | 131 |
| % Propylene | 43 | 44 | 51 | 53 | 52 | 52 | 44 |
| Iodine No. | 7.2 | 7.2 | 5.3 | 4.9 | 5.1 | 4.9 | 7.2 |
| Glass Transition Temp. (°C.) | −60 | −60 | −60 | −59 | −60 | −60 | −60 |
| Efficiency (g Polymer/g VOCl₃) | 722 | 676 | 1000 | 1138 | 1127 | 1263 | 1503 |

$^{(a)}$Ethylaluminumsesquichloride.
$^{(b)}$Intrinsic Viscosity in Tetralin at 135° C.
$^{(c)}$Mooney Viscosity at 212° F. after 4 minutes.
$^{(d)}$Gram atoms aluminum/gram atom vanadium.

EXAMPLE 9

Activation of Premixed Catalyst (Inactive) from Butyl Vanadate and $Et_3Al_2Cl_3$ in EPM Polymerization by ZXU To a small green soda bottle (cleaned, dried in oven at 110° C., and cooled in a nitrogen atmosphere) was added 93.5 ml of dry hexane and 1.1 ml of 0.353 M solution of butylvanadate. The bottle was capped with a three-holed cap containing a rubber septum. Addition of 5.4 ml of 25% EASC (0.740 M) gave a premixed catalyst solution 0.004 M in vanadium and 0.04 M in EASC (Al/V=20/1).

A dry one liter 3-necked flask was fitted with a gas inlet tube which was positioned to extend below the level of the liquid to be added to the flask, a thermometer, a stirrer, and a reflux condenser connected to a gas washing bottle which contained a small amount of mineral oil. The flask was filled with 400 ml of dry hexane under a nitrogen atmosphere. The solvent was then saturated with a 1/1 feed of ethylene and propylene for 15 minutes. After five minutes, 5 ml of 25% EASC was added to ensure a dry system. After ten minutes 5 ml of the premixed catalyst (having 0.02 millimoles of V and 0.4 millimoles of Al) was added. No exotherm was observed and no polymerization took place. After 15 minutes, 1 ml of 0.05 molar UKU was added. The solution immediately began to heat up (indicative of active polymerization catalyst) and after five minutes its temperature had gone from 19° C. to 28° C. The yield of polymer was 10 grams.

Following the above procedure different premixed catalysts were prepared and were treated with either ZXU or UKU in the presence of monomers. The results are shown in Table III. It is surprising that diisobutylaluminum chloride (DIBAC)-$VOCl_3$ could be reactivated; it was previously found that other oxidants do not activate premixed catalyst prepared from either the pure dihalide or the pure monohalide (alkylaluminum component).

TABLE III

| | Activation of Premixed Catalysts in EPM Polymerization | | | | | |
|---|---|---|---|---|---|---|
| | Run | | | | | |
| | A | B | C | D | E | F |
| Hexane (milliliters) | 400 | 400 | 400 | 400 | 400 | 400 |
| Premixed Catalyst | VO(OBu)$_4$ Et$_3$Al$_2$Cl$_3$ | ClVO(OBu)$_2$ Et$_3$Al$_2$Cl$_3$ | ClVO(OBu)$_2$ Et$_3$Al$_2$Cl$_3$ | VOCl$_3$ (iBu)$_2$AlCl | VOCl$_3$ (iBu)$_2$AlCl | VO(OBu)$_4$ Et$_3$Al$_2$Cl$_3$ |
| Vanadium (millimoles) | 0.02 | 0.02 | 0.02 | 0.02 | 0.02 | 0.02 |
| Aluminum (millimoles) | 0.40 | 0.40 | 0.40 | 0.40 | 0.40 | 0.40 |
| Aluminum/Vanadium[b] | 20/1 | 20/1 | 20/1 | 20/1 | 20/1 | 20/1 |
| E/P Feed | 1/1 | 1/1 | 1/1 | 1/1 | 1/1 | 1/1 |
| Activator | UKU | ZXU | UKU | ZXU | UKU | ZXU |
| Millimoles | 0.1 | 0.05 | 0.1 | 0.05 | 0.1 | 0.05 |
| Yield (grams) | 10 | 6.5 | 8.2 | 7.0 | 9.5 | 8.0 |
| E/P Ratio in Polymer | 63/37 | 68/32 | 64/36 | 67/33 | 63/37 | 66/34 |
| IV$^{135}$Tetralin[a] | 3.07 | 4.76 | 3.35 | 4.74 | 3.56 | 3.94 |
| Efficiency (g Polymer/g VO cat.) | 1672 | 1491 | 1881 | 2020 | 2741 | 1338 |

[a]Intrinsic Viscosity in Tetralin at 135° C.
[b]Grams atoms aluminum/gram atom Vanadium.

EXAMPLE 10

Other examples of Chemco Reactor runs using esters of tetrachlorotetrahydrofuroic acid, are shown below in Table IV. The same reaction conditions were used as were used in Example 7, except that the molar quantities of EASC and $VOCl_3$ and the types and quantities of activator were different.

TABLE IV

| | Polymerization Data in a Chemco Reactor | | | |
|---|---|---|---|---|
| | Examples | | | |
| | A 6-98-2 | B 6-176-2 | C 6-150-2 | D 6-169-2 |
| Hexane (milliliters) | 2000 | 2000 | 2000 | 2000 |
| EASC[a] (millimoles) | 18 | 30 | 18 | 18 |
| VOCl$_3$ (millimoles) | 0.5 | 1 | 1 | 1 |
| Aluminum/Vanadium[d] | 72/1 | 60/1 | 36/1 | 36/1 |
| ENB (milliliters) | 5 | 5 | 5 | 5 |
| Compound in Ex. 4 (millimoles) | — | — | 3 | — |
| Compound in Ex. 5 (TOU) (millimoles) | 3 | 5 | — | — |
| Compound in Ex. 6 (millimoles) | — | — | — | 3 |
| Hydrogen (PSI) | 2 | 2 | 2 | 2 |
| Yield (grams) | 225 | 247 | 245 | 233 |
| IV$^{135}$(tet)[b] | 1.12 | 1.25 | 1.27 | 1.32 |
| ML$_4$$^{212}$[c] | 28 | 32 | 33 | 43 |
| % Propylene | 53 | 48 | 55 | 54 |
| Efficiency (g Polymer/g VOCl$_3$) | 2597 | 1425 | 1414 | 1344 |

[a]Ethylaluminumsesquichloride.
[b]Intrinsic Viscosity in Tetralin at 135° C.
[c]Mooney Viscosity at 212° F. after 4 minutes.
[d]Gram atoms aluminum/gram atom Vanadium.

EXAMPLE 11

Chlorination of 2,2'-Oxy-Bis[Ethylene(2-Furoate)](JMU)

In order to prevent the introduction of oxygen or moisture this entire procedure was conducted under a nitrogen atmosphere. To a 2-liter 3-necked flask equipped with a mechanical stirrer, a thermometer, a dropping funnel, and a reflux condenser which was connected to a nitrogen system with a pressure relief (in order to keep the pressure at about atmospheric), was added 750.0 milliliters of purified, dried carbon tetrachloride and 42.2 g of JMU (0.143 moles). The solution was cooled to −10° C. The JMU came out of solution as a fine precipitate. To this mixture, 500 ml of 1.5 M solution of chlorine in CCl$_4$ was added and no increase in temperature was noted. The mixture was warmed to 20° C. over period of an hour. The mixture was then recooled to −15° C. No precipitate formed, so a reaction had obviously occurred. The reaction mixture was then stirred 16 hours and was allowed to warm slowly to room temperature (under a N$_2$ atmosphere) to complete the reaction. After 16 hours the color was almost gone indicating that only a relatively small amount of chlorine remained. N₂ was bubbled through the solution to expel the remaining Cl₂. The CCl₄ was removed by the use of a rotary evaporator. The material was separated from the last traces of CCl₄ by exposure to high vacuum, yielding 94 grams (100% yield) of a compound having 10 chlorine atoms attached thereto.

| Elemental Analysis For: $C_{14}H_{12}Cl_{10}O_7$ (MQW) | | |
|---|---|---|
| Calculated | Found | |
| % C 26.00 | 26.54, | 26.68 |
| % H 1.87 | 2.05, | 2.05 |
| % Cl 54.81 | 50.77, | 51.01 |

TLC shows 4 bands, indicative of four separate isomers.

EXAMPLE 12

Chlorination of Propylene Bis (2-Furoate)

The method of Example 11 was employed using 0.117 moles of propylene bis(2-furoate) and 0.68 moles of chlorine. The yield was 65.5 grams (96.1% yield) based on addition of 4.5 moles of Cl per mole of difuroate.

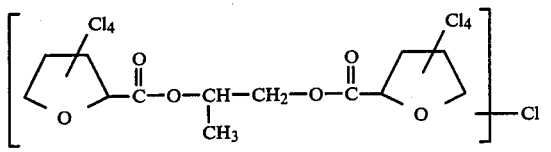

| Elemental Analysis For: $C_{13}H_{11}Cl_9O_6$ (A-1) | | |
|---|---|---|
| Calculated | Found | |
| % C 26.81 | 26.54, | 26.68 |
| % H 1.90 | 2.05, | 2.05 |
| % Cl 54.80 | 53.76, | 53.80 |

The refractive index at 20° C. was 1.5208.

EXAMPLE 13

Chlorination of 2,2'-Oxy-Bis(Propylene-2-Furoate)

The method of Example 11 was employed using 32 grams (0.1 mole) of 2,2'-oxy-bis[propylene(2-furoate)] and 0.69 moles of chlorine. The yield was 76.5 grams.

Based on $C_{16}H_{15}Cl_{11}O_7$, the yield was 100% (based on the weight of the starting material).

| Elemental Analysis For: $C_{16}H_{15}Cl_{11}O_7$ (A-3) | | |
|---|---|---|
| Calculated | Found | |
| % C 27.09 | 25.94, | 26.12 |
| % H 2.13 | 2.25, | 2.21 |
| % Cl 54.98 | 53.73, | 53.60 |

EXAMPLE 14

Chlorination of Ethylene Bis(2-Furoate)

The method of Example 11 was employed using 0.15 moles of ethylene bis(2-furoate) and 0.640 moles of Cl₂. However, since the difuroate was insoluble in CCl₄, 750 milliliters of methylene chloride was used in place of the CCl₄. On cooling, the difuroate precipitated as a fine powder and this was what was chlorinated. The elemental analysis shows that the difuroate did not add even the eight atoms of chlorine expected as a minimum.

| Elemental Analysis For: $C_{12}H_{10}Cl_8O_6$ (A-2) | | |
|---|---|---|
| Calculated | Found | |
| % C 27.00 | 30.30, | 30.19 |
| % H 1.89 | 1.92, | 2.04 |
| % Cl 53.13 | 44.35, | 44.50 |

EXAMPLE 15

The conditions in Example 9 were used to examine the activators described in Table V with the exception that the catalyst mixture was prepared in situ. Comparison with the blank (run G) shows that all the compounds are activators but some are not good regulators of the molecular weight of the polymer produced.

TABLE V

| | Activation With Chlorinated Difuroates | | | | | | |
|---|---|---|---|---|---|---|---|
| Example | A | B | C | D | E | F | G |
| Heptane (milliliters) | 700 | 700 | 700 | 700 | 700 | 700 | 700 |
| Ethylene (liter/min.) | 3.9 | 3.9 | 3.9 | 3.9 | 3.9 | 3.9 | 3.9 |
| Propylene (liter/min.) | 3.8 | 3.8 | 3.8 | 3.8 | 3.8 | 3.8 | 3.8 |
| EASC$^{(a)}$ (millimoles) | 0.52 | 0.52 | 0.52 | 0.52 | 0.52 | 0.52 | 0.52 |
| VOCl₃ (millimoles) | 0.05 | 0.05 | 0.05 | 0.05 | 0.05 | 0.05 | 0.05 |
| Activator | MQW | MQW | A-1 | A-2 | MQW | A-3 | BLANK |
| Millimoles | 0.2 | 0.1 | 0.05 | 0.05 | 0.05 | 0.1 | — |
| Yield (grams) | 42 | 41 | 27.6 | 30 | 39.5 | 15 | 10 |
| Efficiency (g polymer/ g VOCl₃) | 4847 | 4732 | 3125 | 3462 | 4559 | 1731 | 1154 |
| Glass Transition Temp. (°C.) | −61 | −59 | −60 | −58 | −59 | — | −62 |
| IV$^{135}$ Tetralin$^{(b)}$ | 1.73 | 2.08 | 3.40 | 3.15 | 2.28 | — | 2.62 |
| % Propylene in Polymer | 41 | 37 | 33 | 32 | 36 | — | 30 |

$^{(a)}$Ethylaluminumsesquichloride.
$^{(b)}$Intrinsic Viscosity in Tetralin @ 135° C.
A-1—Chlorinated propylene bis(2-furoate)
A-2—Chlorinated ethylene bis(2-furoate)
A-3— Chlorinated 2,2'-Oxy-bis[propylene(2-furoate)].
MQW—Chlorinated 2,2'-Oxy-bis[ethylene(2-furoate)]

EXAMPLE 16

Bis (trichloromethyl) sulfone was prepared by the chlorination of dimethyl sulfoxide according to the method of Charles Di Santo disclosed in U.S. Pat. No. 3,304,331 (C.A. 66 104691e).

Activation experiments were carried out by the method of Example 7 except that bis (trichloromethyl) sulfone (CYU) was used instead of UKU.

TABLE VI

Bis (trichloromethyl) sulfone (CYU) as Activator in EPDM Polymerizations

| Example | Part 1 | | | | Part 2 | | | | | | Part 3 | | |
|---|---|---|---|---|---|---|---|---|---|---|---|---|---|
| | A | B | C | D | E | F | G | H | I | J | K | L | M |
| Hexane (milliliters) | 2000 | 2000 | 2000 | 2000 | 2000 | 2000 | 2000 | 2000 | 2000 | 2000 | 2000 | 2000 | 2000 |
| EASC[a] (millimoles) | 9 | 22 | 22 | 22 | 22 | 22 | 22 | 22 | 22 | 22 | 16.5 | 30 | 29.6 |
| $VOCl_3$ (millimoles) | 1 | 0.2 | 0.75 | 0.75 | 1 | 1 | 1 | 1 | 1 | 0.5 | 1 | 1 | 2 |
| Aluminum/Vanadium[f] | 18/1 | 220/1 | 58.6/1 | 58.6/1 | 44/1 | 44/1 | 44/1 | 44/1 | 44/1 | 88/1 | 33/1 | 60/1 | 29.6/1 |
| ENB (milliliters) | 5 | — | 5 | 5 | 5 | 5 | — | 5 | 5 | 5 | 5 | 5 | 5 |
| CYU (millimoles) | — | 5 | 5 | 5 | 5 | 3 | 3 | 6 | 6 | 7 | 2 | 5 | 8 |
| Pyridine (millimoles) | — | 7 | 7 | — | 3 | 3 | 3 | 7 | 4 | — | 2.5 | 10 | 7 |
| Jeffamine-2000 | — | — | — | — | — | — | — | — | — | 3 ml | — | — | — |
| Hydrogen (PSI) | — | — | — | — | — | 2 | 2 | — | 2 | 2 | 2 | — | — |
| Yield (grams) | 86.9 | 150.4 | 173.8 | 152.0 | 186.1 | 120.0 | 159.7 | 192.0 | 198.6 | 204.9 | 105.1 | 210.5 | 161.4 |
| Flocculation Medium | [b] | [b] | steam | steam | steam | [b] | [b] | [b] | [b] | [b] | [b] | [b] | [b] |
| $IV^{135}$(Tetralin)[c] | 2.07 | 1.96 | 1.36 | 1.27 | 1.38 | 1.50 | 1.50 | 1.79 | 1.03 | 0.94 | 1.71 | 1.68 | 2.03 |
| ML-4 @ 212[d] | — | — | 41 | 28 | 45 | 90 | 54 | 45 | 27 | 15 | 71 | 54 | — |
| % Propylene | 43 | 52 | 50 | 46 | 47 | 47 | 51 | 53 | 50 | — | 46 | 46 | 49 |
| Efficiency (g Polymer/g $VOCl_3$) | 501 | 4339 | 1337 | 1169 | 1076 | 692 | 922 | 1108 | 1146 | 2365 | 606 | 1215 | 466 |
| Iodine Number (R.I.)[e] | — | 0 | 9.7 | — | 13.5 | — | — | 8.5 | 6.7 | 6.4 | — | 12.5 | 7.0 |

[a]Ethylaluminumsesquichloride
[b]Isopropanol
[c]Intrinsic Viscosity in tetralin at 135° C.
[d]Mooney Viscosity at 212° F. after 4 minutes
[e]Refractive Index method
[f]Gram atoms aluminum/gram atom vanadium
ENB Ethylidene norbornene
CYU Bis (trichloromethyl) sulfone Registered trademark — Jefferson Chemical Co. (Texaco). Jeffamine 2000 is a polyether diamine with a molecular weight of 2000 it was mixed with hexane (1/9) to form a 10% solution for polymerization trials.

We claim:

1. A catalyst composition comprising an activator in combination with a primary catalyst system, wherein said primary catalyst system comprises a vanadium compound and an organometallic compound of the formula RMgX, $LiAlR_4$, or $R_AAl_2X_B$, wherein R is a hydrocarbon radical having 1 to 12 carbon atoms, X is a halogen atom; A is a number from 2 to 6, and B is a number from 0 to 4, with the proviso that the sum of A and B is 6 and that at least one of the groups attached either to the vanadium compound or to the organometallic compound is a halogen atom, and said activator is a chlorinated tetrahydrofurfuryl tetrahydrofuroate, an alkyl ester of chlorinated tetrahydrofuroic acid wherein the alkyl group has 1 to 8 carbon atoms, a chlorinated alkylene bis-tetrahydrofuroate wherein the alkylene group has 2 or 3 carbon atoms, a chlorinated oxy-bis [alkylene (2-furoate)], wherein the alkylene group is ethanediyl, 1,3 propanediyl, alkyl substituted ethanediyl or alkyl substituted, 1,3 propanediyl wherein the alkyl group on the ethanediyl or 1,3 propanediyl has 1 to 8 carbon atoms.

2. A catalyst composition comprising an activator in combination with a primary catalyst system, wherein said primary catalyst system comprises a vanadium compound and an organometallic compound of the formula $R_AAl_2X_B$, wherein R is a hydrocarbon radical having 1 to 12 carbon atoms, X is a halogen atom, A is a number from 2 to 6 and B is a number from 0 to 4, with the proviso that the sum of A and B is 6 and that at least one of the groups attached either to the vanadium compound or to the organometallic compound is a halogen atom, and said activator is a chlorinated tetrahydrofurfuryl tetrahydrofuroate, an alkyl ester of chlorinated tetrahydrofuroic acid wherein the alkyl group has 1 to 8 carbon atoms, a chlorinated alkylene bistetrahydrofuroate wherein the alkylene group has 2 to 3 carbon atoms, a chlorinated oxy-bis[alkylene(2-furoate)] wherein the alkylene group is ethanediyl, 1,3 propanediyl, alkyl substituted ethanediyl or alkyl substituted 1,3 propanediyl wherein the alkyl group on the ethanediyl or the 1,3 propanediyl has 1 to 8 carbon atoms.

3. A composition according to claim 1 or claim 2, wherein the activator is tetrachlorotetrahydrofurfuryl, tetrachlorotetrahydrofuroate, an alkyl ester of tetrachlorotetrahydrofuroic acid, an alkylene bis-tetrachlorotetrahydrofuroate, an oxy-bis [alkylene (tetrachlorotetrahydro 2-furoate)].

4. A composition according to claim 1 or claim 2, wherein the vanadium compound is a halide, oxyhalide, alkoxide, or acetylacetonate.

5. A composition according to claim 1 or claim 2, wherein the vanadium compound is vanadium trichloride, vanadium tetrachloride, vanadium tetrabromide, vanadium oxytrichloride, an alkyl vanadate, a vanadyl acetylacetonate, a vanadium acetylacetonate or a halovanadate.

6. A composition according to claim 1, wherein the organoaluminum compound has the formula $R_AAl_2X_B$.

7. A composition according to claim 1 or claim 2, wherein $R_AAl_2X_B$ is ethylaluminum sesquichloride, diisobutylaluminum chloride, ethylaluminum dibromide, tri-n-hexyl-aluminum, diethylaluminum iodide, tridecylaluminum or methylaluminum sesquichloride.

8. A composition according to claim 1, wherein the compound having the formula $LiAlR_4$ is a lithium tetraalkylaluminate.

9. A composition according to claim 8, wherein the lithium tetraalkylaluminate is the tetraethylaluminate, the tetrabutylaluminate or the tetrahexylaluminate.

10. A composition according to claim 1, wherein the compound of the formula RMgX is decylmagnesium iodide, decylmagnesium chloride, or hexylmagnesium bromide.

11. A composition according to claim 1 or claim 2, wherein the activator is chlorinated ethylene-bis-(2-furoate), chlorinated propylene-bis-(2-furoate), chlorinated oxy-bis[ethylene(2-furoate)], chlorinated oxy-bis-[propylene(2-furoate)] or a methyl, ethyl, butyl, hexyl, octyl, isopropyl, sec-butyl or tert-butyl ester of tetrachlorotetrahydrofuroic acid, or tetrachlorotetrahydrofurfuryl tetrachlorotetrahydrofuroate.

12. A composition according to claim 11, wherein the activator is butyl tetrachlorotetrahydrofuroate or tetrachlorotetrahydrofurfuryl tetrachlorotetrahydrofuroate.

13. A composition according to claim 1 or claim 2, wherein the primary catalyst system is a hydrocarbon soluble catalyst formed by the interaction of an alkyl aluminum halide and vanadium oxychloride, vanadium tetrachloride, an alkyl vanadate, or an alkylchlorovanadate.

14. A composition according to claim 13, wherein the gram atom ratio of aluminum to vanadium is at least 5 to 1.

15. A composition according to claim 14, wherein the gram atom of aluminum to vanadium is at least 10 to 1.

16. A composition according to claim 1 or claim 2, wherein there is at least 0.01 moles of activator per mole of vanadium.

17. A composition according to claim 1 or claim 2, wherein there is at least 1 mole of activator per mole of vanadium.

18. A composition according to claim 17, wherein there are 1 to 10 moles of activator per mole of vanadium.

19. A composition according to claim 1 or claim 2, wherein the alkyl group on the ethanediyl has 1 to 8 carbon atoms.

* * * * *